Aug. 15, 1961  H. V. BANNISTER  2,996,242
PATTERN HEADING CALCULATOR
Filed Oct. 2, 1958
FIG. 1.
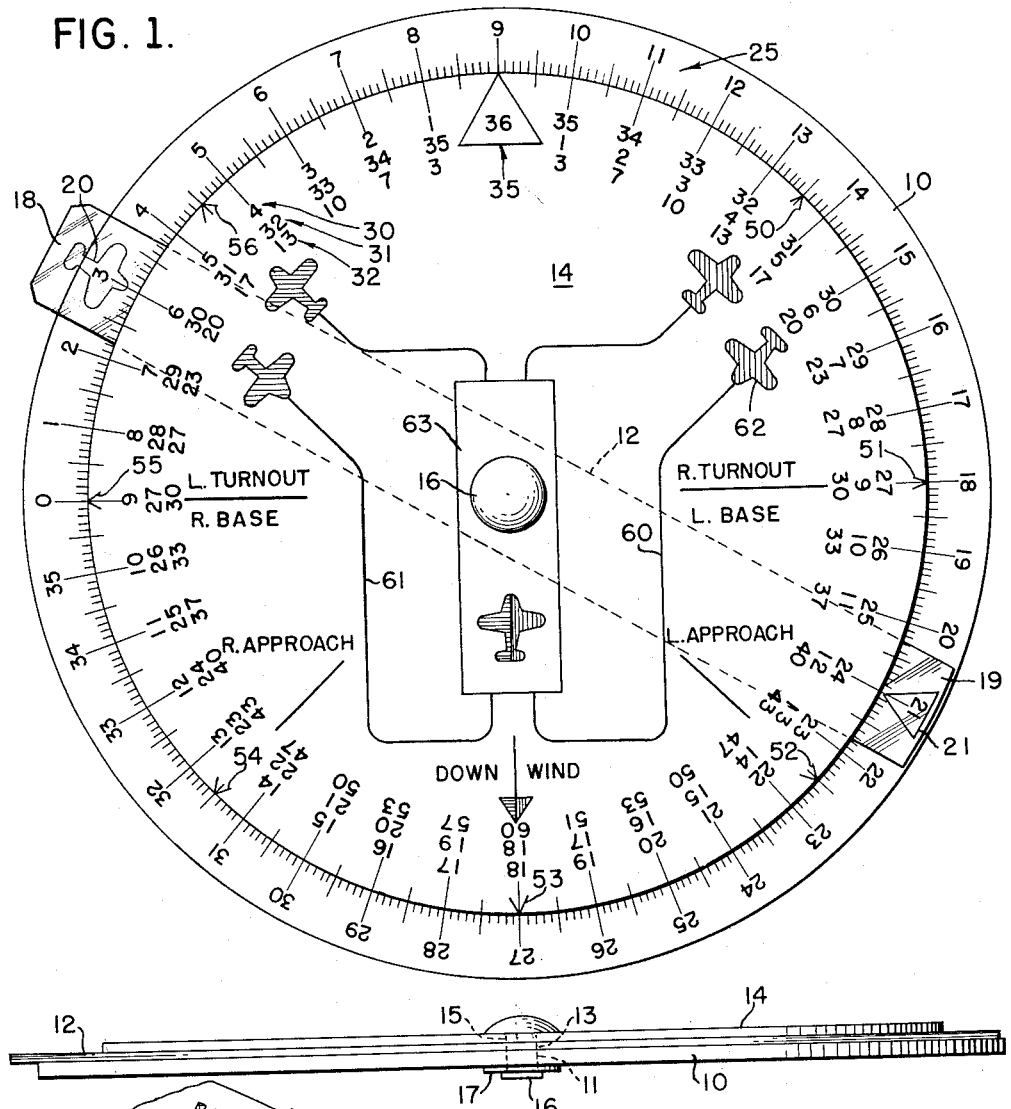
FIG. 2.
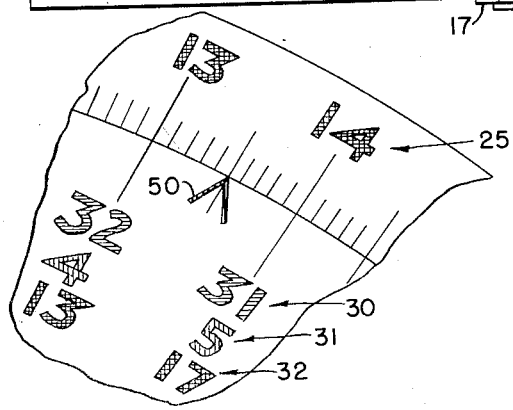
FIG. 3.
INVENTOR
Harold V. Bannister
BY *Shoemaker & Mattare*
ATTORNEYS

United States Patent Office 2,996,242
Patented Aug. 15, 1961

2,996,242
PATTERN HEADING CALCULATOR
Harold V. Bannister, 1010 E. Bremer, Waverly, Iowa, assignor of one-half to Leon J. Wamsley, Waverly, Iowa
Filed Oct. 2, 1958, Ser. No. 764,960
8 Claims. (Cl. 235—61)

The present invention relates to a new and novel pattern heading calculator and more particularly to a calculator for indicating the compass headings for right- and left-hand flight patterns for any given runway at an airport.

All major airports in the United States follow a uniform system as to the flight pattern which planes must follow in landing and taking off from runways. For any given runway, there is a particular compass heading for initial approach, the downwind leg, the base leg, the upwind or final approach leg, the turn-out leg, and the path to be followed in leaving the pattern. In addition, either right-hand or left-hand approaches may be employed with any particular runway.

When a pilot is approaching a strange airport, he is, of course, given a particular runway number upon which he must land. This runway number represents the particular compass heading of the runway whereby the pilot is informed by the number of the runway of the exact compass heading or direction in which the runway extends. After receiving the runway number and determining the direction of the runway, it is necessary for the pilot to calculate the various compass headings to be followed in the approach. It has been a common practice for many years to either mentally compute these various headings or to determine the compass headings from a set of voluminous tables contained in a suitable book. These procedures are time consuming and distracting at time when the pilot is called upon to make a number of adjustments in flying the plane. It is this particular problem which is a specific object of the present invention to overcome.

In contrast to conventional methods wherein the compass headings must be calculated and then either jotted down or mentally retained by the pilot, it is obviously highly desirable to provide a device wherein the compass headings may be automatically determined and easily read off visually. By providing such a visual type automatic calculator, the necessity of making mental computations or obtaining compass headings from tables is completely eliminated.

The calculator according to the present invention includes first and second discs which are pivotally interconnected to one another at the central portions thereof. An elongated arm is also pivotally mounted about the point of pivotal interconnection between the two discs. One of the discs is of lesser diameter than the other, and the arm projects outwardly beyond diametrically opposite portions of the inner disc.

The outer disc is provided with a scale extending completely therearound and positioned closely adjacent the outer periphery of the inner disc, the outer scale being divided into 360 equal increments representing 360 degrees of compass headings. The opposite end portions of the arm are provided with heading marks which are adapted to be aligned with the scale on the outer disc, and since these marks are diametrically opposite from one another, reciprocal heading and bearings may be quickly and easily obtained.

The inner disc is provided with three concentric scales which are divided into 36 principal divisions, these scales being suitably marked to indicate degrees of turn in different directions and the number of seconds required to make a certain turn while a plane is in a standard rate turn. The 0 point of the three scales on the inner disc is provided with an index marker which is adapted to be aligned with the outer scale so that the index marker is aligned with the compass heading of the runway upon which a pilot is landing or taking off. Suitable pattern marks are provided at 45 degree intervals about the inner disc for indicating the compass headings of the plane in the flight pattern for both left-hand and right-hand approaches.

The inter-cooperation of the various scales and markings thereon is such that the inner disc can be quickly and easily set in proper position by aligning the index marker with the compass heading of the selected runway, and the various compass headings of the plane in the flight pattern are automatically adjusted and can be quickly and easily read directly off of the scale formed on the outer disc. In addition, the pilot can quickly determine the number of seconds required to make a turn of a certain number of degrees and can immediately read off his new compass heading after making such turn.

The arm member may be employed for rapidly obtaining reciprocal heading and bearings. The device is so arranged as to very clearly indicate the various readings to a pilot without causing confusion or delay, the various scales intercooperating in a novel manner so as to provide the desired results without interfering with the readings taken from the various scales.

A particular advantage of the present invention is the fact that it is extremely simple to operate, and compass headings may be obtained quickly and easily by even the most inexperienced pilots and the possibilities of errors occurring in the compass headings are reduced to a minimum.

An object of the present invention is the provision of a new and novel pattern heading calculator which is especially adapted to provide the compass headings of an airplane in flight patterns involved in both right-and left-hand approaches.

Another object is the provision of a pattern heading calculator which is very easy to operate and reduces the possibility of making errors to a minimum.

A further object of the invention is to provide a pattern heading calculator which completely eliminates the necessity of performing mental calculations for the utilization of voluminous tables in determining compass headings.

Yet another object is the provision of a pattern heading calculator which is very simple and inexpensive in construction, yet which is quite accurate, efficient and reliable in operation.

Other objects and many attendant advantages of the present invention will become more evident when considered in connection with the accompanying specfication and drawing wherein:

FIG. 1 is a plan view of the calculator according to the present invention;

FIG. 2 is a front elevation of the device as shown in FIG. 1; and

FIG. 3 is an enlarged view of a portion of the device as shown in FIG. 1.

Referring now to the drawing wherein like reference characters designate corresponding parts throughout the several views, a first flattened substantially circular disc member 10 is provided with a central opening 11 formed therethrough, and an elongated arm 12 formed of a suitable transparent material such as plastic or the like is also provided with a central opening 13. A flattened substantially circular disc member 14 is provided with a central opening 15 and a rivet 16 extends through the aligned openings in discs 10 and 14 and arm 12 for securing them to one another and permitting relative rotation therebetween. A washer 17 is disposed between the undersurface of disc member 10 and the enlarged lower end of the rivet 16 whereby the three members 10, 12 and 14 are supported between washer 17 and the enlarged upper end of the rivet.

The diameter of disc 14 is less than that of disc 10, and the length of arm 12 is such that the opposite end portions 18 and 19 project outwardly beyond diametrically opposite portions of disc 14. End portion 18 of arm 12 is provided with a suitable mark 20, shown as being in the general shape of an airplane, and end portion 19 is also provided with a suitable mark thereon which is shown as being of triangular shape. The manner of utilization of arm 12 will be more clearly pointed out hereinafter.

A scale indicated generally by reference numeral 25 is formed on outer disc 10 completely therearound and immediately outwardly of the outer periphery of inner disc 14. Scale 25 includes marks dividing the scale into 360 equal increments representing 360 degrees of compass headings, the larger marks at 10 degree intervals being numbered from 0 to 35, it being understood that an additional 0 must be added to these numbers in order to obtain the proper number of degrees as, for example, number 1 represents 10 degrees, number 2 represents 20 degrees, etc. It is evident that by aligning mark 20 on end portion 18 of arm 12, at a suitable point on scale 25 such that mark 20 represents the compass heading of the airplane, the reciprocal heading may be immediately read off of scale 25 in accordance with the position of mark 21 at the opposite end portion of the arm since the apex of the triangle will indicate the particular reciprocal heading. As shown in the drawing, the compass heading of the airplane is 30 degrees and the reciprocal heading is 210 degrees as indicated by heading mark 21.

The inner disc 14 is provided with three concentric scales indicated generally by reference numerals 30, 31, and 32, each of these scales being associated with suitable indicia or markings divided into 72 equal increments, each of the increments representing 5 degrees for a total of 360 degrees corresponding to 360 degrees of compass heading. An index marker indicated by reference numeral 35 comprises a generally triangularly shaped mark having a numeral 36 imprinted therein, the apex of the triangle representing the 0 point of the three scales 30, 31, and 32.

As seen in FIG. 1, scale 30 is numbered from 1 to 36 in a counter clockwise direction and scale 31 is numbered from 1 to 36 in a clockwise direction. Innermost scale 32 is numbered in successively increasing numbers from the index marker around to the diametrically opposite portion of the inner disc. The purpose of these scales will be more fully hereinafter pointed out.

Seven pattern marks indicated consecutively in clockwise order by reference numerals 50, 51, 52, 53, 54, 55, and 56, are formed on the inner disc closely adjacent the outer periphery thereof, and are spaced from one another by equal 45 degree increments, marks 50 and 56 being spaced by 45 degree increments from index marker 35. These pattern marks represent the compass heading for an airplane in the flight pattern for both left- and right-hand approaches. For example, considering a right-hand approach, index mark 54 indicates the compass bearing for the initial approach, index mark 53 indicates the compass heading for the downwind leg, mark 55 indicates the compass heading for the right base leg, index marker 36 indicates the compass heading for the final approach, mark 51 indicates the compass heading for the right turn-out, and mark 50 indicates the compass heading for the plane when leaving the pattern. It is evident that the various compass headings are read off of outside scale 25 on disc 10 merely by noting the points at which the various pattern marks intersect the outer scale 25.

For a left-hand approach, mark 52 indicates the compass heading of the initial approach, mark 53 indicates the compass heading for the downwind leg, mark 51 indicates the compass heading for the base leg, index marker 35 indicates the compass heading for the final approach, mark 55 represents the compass heading for the turn-out leg, and mark 56 indicates the compass heading for leaving the pattern.

In order for the pilot to very quickly visually read off the proper compass headings in accordance with whether he is making a right- or left-hand approach, a suitable means is provided for distinguishing the various index marks. For example, marks 51, 52, 53, 54, and 55 are provided with suitable legends adjacent thereto for indicating which pattern marks they represent. Additionally, marks 50 and 56 may also be provided with suitable legends, for example, as shown herein they are of different colors to indicate whether they represent left- or right-hand approaches. Pattern mark 50 may be colored red for a right-hand approach, and pattern mark 56 may be colored blue for a left-hand approach. Any color or other suitable distinguishing means may be employed such that these marks may be readily distinguished. In addition, the legends may be also printed in suitable colors so that they can more readily be observed at a glance.

As shown, the general flight path for a right-hand approach is indicated schematically by line 60 and a similar line 61 schematically indicates the general flight path for a left-hand approach. An airplane is schematically indicated by marking 62 in order to facilitate quick reading of the scales. The runway is schematically indicated at 63 in order to give the pilot a better overall picture of the relationship of the runway and the plane at all times.

When the pilot is given a runway number which in fact represents the compass heading of the runway, he immediately sets the index marker along scale 25 in accordance with the runway number. The various compass headings may then be immediately and very easily read directly off of scale 25 from pattern marks 50—56. As shown in the drawing, a runway having a compass heading of 90 degrees has been assigned to the pilot and the index marker has been aligned with number 9 of scale 25. The various compass headings are then readily apparent for either left- or right-hand approaches.

Scale 30 represents in degrees left-hand turn from index marker 36. In other words, index marker 36 is set at the compass heading of the plane which, as shown, would be 90 degrees. If it is desired to make a left-hand turn of 40 degrees, the pilot merely reads counter clockwise along scale 30 to number 4, which represents a turn of 40 degrees. He then reads down to the corresponding marking of the innermost scale 32 and obtains a reading as to the number of seconds of a standard rate turn which are required to make a turn of 40 degrees. The pilot then knows that he must place the airplane in a standard rate turn of 3 degrees per second and hold it for a period of approximately 13 seconds in order to make a turn of 40 degrees. While this is only approximate, it is a good approximation and is the method commonly employed by pilots in turning through certain angles. In addition, the pilot is immediately informed by reference to the calculator that after making a turn of 40 degrees, his new compass heading will be 50 degrees as indicated on outer scale 55.

In a like manner, if the pilot wishes to make a right-hand turn of, say 110 degrees, he merely reads clockwise around scale 31 to number 11 which represents a right-hand turn of 110 degrees. He then sees that he must make a standard rate turn for 37 seconds in order to turn to an angle of approximately 110 degrees. The pilot is also informed by reference to scale 25 that his new compass heading will be 200 degrees. It is evident that both right- and left-hand standard rate turns may be made by reference to the calculator and a new compass heading may be quickly and easily read off from scale 25. It will be noted that inner scale 32 increases up to the point diametrically opposite from index marker 36, it being apparent that a right-hand or left-hand turn of 90 degrees will ordinarily be the maximum turn in either direction.

In operation, the triangular course pointer or marker 21 at the end of the arm is initially set at the compass heading, and as shown on FIG. 2, the compass heading of the plane is shown as being 210 degrees. The index marker 35 is then set to the runway number which in the drawings is shown as a runway having a compass heading of 90 degrees. The pilot then holds the calculator so that the course pointer for arm 12 and marker 21 are aligned with the plane. It is then evident that mark 20 indicates the position of the pilot's plane with respect to the runway indicated schematically at 63. The pattern marks 50—56 then indicate the appropriate compass headings for all legs of the pattern. It is evident that the calculator may be employed for turning out of the pattern when taking off.

It is evident that the calculator according to the present invention may also be employed in conventional beam bracketing and ADF bracketing procedures and plotting fixes as well as when making time turns and obtaining reciprocal heading and bearings or number of degrees to turn as pointed out previously.

It is apparent from the foregoing that there is provided a new and novel pattern heading calculator which is especially adapted to provide the compass heading in flight patterns for both right- and left-hand approaches. The calculator is quite simple to operate and reduces the possibility of making errors to a minimum. The device may be employed successfully by even the most inexperienced pilots, and the necessity of making mental calculations or employing tables and charts is completely eliminated. The device is quite simple and inexpensive in construction and yet is quite accurate, efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. In a pattern heading calculator, a first substantially circular member, a second substantially circular member connected to said first circular member and rotatable with respect thereto, said second rotatable member being of smaller dimension than said first rotatable member, and an arm member pivotally connected to said first and second members and projecting outwardly beyond diametrically opposite edge portions of said second member, said arm having heading marks thereon, said first member having a first scale formed therearound adjacent the outer edge thereof and positioned closely adjacent the outer edge of said second member, said first scale having equal divisions representing compass headings from 0 to 360 degrees, said second member having an index marker formed thereon closely adjacent the outer edge thereof and adapted to be aligned with a suitable marking on said first scale, said second member having a plurality of pattern marks formed thereon closely adjacent the outer edge thereof, said last-mentioned marks being spaced from one another such that when said index marker is aligned with the proper compass heading as indicated on the said first scale, said pattern marks indicate the compass heading for approach to the pattern, the downwind leg, the base leg, the final approach, the turnout, and the path to be followed in leaving the pattern, said pattern marks indicating the proper compass headings for both right- and left-hand approaches.

2. A pattern heading calculator as defined in claim 1, wherein said pattern marks comprise in addition to said index marker, seven marks spaced at 45 degree intervals from one another and from said index marker, and means for identifying each of said marks.

3. Apparatus as defined in claim 1, wherein said arm member includes interconnected diametrically opposite end portions, each of said opposite end portions having said marks formed thereon for indicating bearings and reciprocal bearings.

4. A pattern heading calculator as defined in claim 1 including indicia formed closely adjacent the outer edge of said second member, a second scale formed on said second member adjacent said indicia for indicating degrees of turn, and a third scale formed adjacent said second scale for indicating the approximate number of seconds required to turn through an angle as indicated by said second scale.

5. A pattern heading calculator as defined in claim 4 including a fourth scale formed on said second member adjacent said second scale for indicating degrees of turn in a direction opposite to the direction of turn indicated by said second scale.

6. A pattern heading calculator comprising a first disc, a second disc of lesser diameter than said first disc, said first and second discs being pivotally interconnected to one another at the central portions thereof, an elongated arm pivotally mounted about the point of pivotal interconnection by the said first and second discs, said arm having the opposite ends thereof projecting diametrically outwardly of the outer periphery of said second disc, said arm having heading marks formed thereon for indicating reciprocal heading and bearings, said first disc having a first scale formed thereon immediately outwardly of the outer periphery of said second disc, said first scale being divided into 360 equal increments representing 360 degrees of compass headings, said second disc member having three scales formed thereon immediately adjacent the outer periphery thereof, said three scales having one indicia defining 72 equal increments representing 360 degrees of compass headings, said second disc member having three scales formed thereon immediately adjacent the outer periphery thereof, said three scales having one indicia defining 72 equal increments representing 360 degrees of compass headings in five degree increments, an index marker being formed at the 0 point of the said last-mentioned three scales, and pattern marks formed at 45 degree intervals about said last-mentioned scales and defining the compass headings for left- and right-hand flight patterns for a given runway wherein the index marker is adapted to be placed in registry with a compass heading as defined on said first scale corresponding to the compass heading of the runway.

7. The calculator as defined in claim 6, wherein one of said last-mentioned three scales is marked in successively increasing numbers in one direction about the outer periphery of said second disc, another of said scales being marked in successively increasing numbers in an opposite direction to said last-mentioned numbers, and said third scale being marked in successively increasing numbers in each direction away from said index marker to a point diametrically opposite from said index marker.

8. In a pattern heading calculator including a pair of interconnected circular members rotatably mounted with respect to one another, wherein the outer diameter of one of said members is slightly greater than the outer diameter of the other member, said one member having a scale formed thereon immediately diametrically outwardly of the outer periphery of said other member, said scale being divided into equal divisions representing compass headings from 0° to 360°, said other member having an index marker formed thereon immediately adjacent the outer periphery thereof and adapted to register with said scale, said other member having a plurality of substantially equally spaced pattern marks around thereon immediately adjacent the outer periphery thereof so as to register with said scale, said pattern marks being disposed at substantially 45° intervals from one another, means identifying said pattern marks to visually indicate which compass headings the pattern marks represent in a particular flight pattern while approaching or leaving an airport, and additional visual indicating means formed on said other member representing an airfield and flight patterns for both right and left turn-in and turn-out when approaching or leaving an airfield such that a pilot is readily oriented as to the relationship of an aircraft with respect to an airfield at all times while employing the calculator.

References Cited in the file of this patent

UNITED STATES PATENTS

| | | |
|---|---|---|
| 2,253,279 | Loew | Aug. 19, 1941 |
| 2,299,444 | Warner | Oct. 20, 1942 |
| 2,329,274 | Lamoreaux | Sept. 14, 1943 |
| 2,481,846 | King | Sept. 13, 1949 |
| 2,560,590 | Ocker | July 17, 1951 |

FOREIGN PATENTS

| | | |
|---|---|---|
| 566,146 | Great Britain | Sept. 22, 1943 |